US012713044B2

(12) United States Patent
Zhao et al.

(10) Patent No.: US 12,713,044 B2
(45) Date of Patent: Aug. 18, 2026

(54) EXTENDED QUANTIZER WITH FINER STEP SIZE

(71) Applicant: Tencent America LLC, Palo Alto, CA (US)

(72) Inventors: Xin Zhao, San Jose, CA (US); Roman Chernyak, Santa Clara, CA (US); Xiaozhong Xu, State College, PA (US); Lien-Fei Chen, Hsinchu (TW); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 85 days.

(21) Appl. No.: 18/443,056

(22) Filed: Feb. 15, 2024

(65) Prior Publication Data

US 2024/0283959 A1 Aug. 22, 2024

Related U.S. Application Data

(60) Provisional application No. 63/446,285, filed on Feb. 16, 2023.

(51) Int. Cl.
*H04N 19/00* (2014.01)
*H04N 19/124* (2014.01)
(Continued)

(52) U.S. Cl.
CPC ........... *H04N 19/44* (2014.11); *H04N 19/124* (2014.11); *H04N 19/176* (2014.11); *H04N 19/18* (2014.11)

(58) Field of Classification Search
None
See application file for complete search history.

(56) References Cited

U.S. PATENT DOCUMENTS 7,570,818 B2 * 8/2009 Shen .................... H04N 19/126 382/268
10,432,934 B2 * 10/2019 Aoki ...................... H04N 19/50
(Continued)

FOREIGN PATENT DOCUMENTS

JP 2017-085498 A 5/2017

OTHER PUBLICATIONS

Browne et al., "Algorithm description for Versatile Video Coding and Test Model 19 (VTM19)", Joint Video Experts Team (JVET) of ITU-T SG 16 WP 3 and ISO/IEC JTC 1/SC 29 28th Meeting, by teleconference, Oct. 20-28, 2022, Document: JVET-AB2002-v2, Oct. 2022, 7 pages.
(Continued)

*Primary Examiner* — Zhihan Zhou
(74) *Attorney, Agent, or Firm* — ARENTFOX SCHIFF LLP

(57) ABSTRACT

A video bitstream including a current block in a current picture is received. A set of candidate quantization step sizes of a current block is determined from a plurality of sets of candidate quantization step sizes associated with quantization parameters (QPs). Each of the plurality of sets of candidate quantization step sizes includes a different number of the candidate quantization step sizes. One or more quantization step sizes are determined from the set of candidate quantization step sizes for the current block. Transform coefficients of the current block are determined based on the determined one or more quantization step sizes. The current block is reconstructed based on the determined transform coefficients of the current block.

20 Claims, 6 Drawing Sheets

(51) Int. Cl.
*H04N 19/176* (2014.01)
*H04N 19/18* (2014.01)
*H04N 19/44* (2014.01)

(56) References Cited

U.S. PATENT DOCUMENTS

| | | | | |
|---|---|---|---|---|
| 2005/0084157 | A1* | 4/2005 | Shen | H04N 19/126 375/E7.14 |
| 2010/0208805 | A1* | 8/2010 | Yu | H04N 19/147 375/E7.279 |
| 2012/0093220 | A1* | 4/2012 | Yu | H04N 19/154 375/E7.243 |
| 2019/0158831 | A1* | 5/2019 | Jung | H04N 19/157 |
| 2021/0209811 | A1* | 7/2021 | Ramasubramonian | G06T 9/001 |
| 2021/0281846 | A1* | 9/2021 | Hsiang | H04N 19/167 |
| 2021/0329275 | A1* | 10/2021 | Chien | H04N 19/186 |
| 2022/0070460 | A1* | 3/2022 | Ikonin | H04N 19/124 |
| 2022/0070462 | A1* | 3/2022 | Ikonin | H04N 19/44 |
| 2022/0132169 | A1* | 4/2022 | Helmrich | H04N 19/12 |
| 2022/0150517 | A1* | 5/2022 | Du | H04N 19/70 |
| 2022/0210451 | A1* | 6/2022 | Jung | H04N 19/159 |
| 2022/0217349 | A1* | 7/2022 | Jhu | H04N 19/70 |
| 2022/0303567 | A1* | 9/2022 | Jung | H04N 19/124 |
| 2023/0328293 | A1* | 10/2023 | Chen | H04N 19/42 375/240.29 |
| 2023/0345003 | A1* | 10/2023 | Chen | H04N 19/124 |
| 2024/0064296 | A1* | 2/2024 | Chen | G06N 3/0985 |
| 2025/0142067 | A1* | 5/2025 | Wei | H04N 19/40 |

OTHER PUBLICATIONS

International Telecommunications Union Standardization Sector, "Versatile video coding", Series H: Audiovisual and multimedia systems Infrastructure of audiovisual services—Coding of moving video, H.266, Apr. 2022, 14 pages.

Office Action received for Japanese Patent Application No. 2025-540248, mailed on May 19, 2026, 20 pages (9 pages of English Translation and 11 pages of Original Document).

* cited by examiner

EXTENDED QUANTIZER WITH FINER STEP SIZE

INCORPORATION BY REFERENCE

The present application claims the benefit of priority to U.S. Provisional Application No. 63/446,285, "Extended Quantizer with Finer Step Size" filed on Feb. 16, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video encoding/decoding includes processing circuitry.

According to an aspect of the disclosure, a method of video decoding is provided. In the method, a video bitstream including a current block in a current picture is received. A set of candidate quantization step sizes of a current block is determined from a plurality of sets of candidate quantization step sizes associated with quantization parameters (QPs). Each of the plurality of sets of candidate quantization step sizes includes a different number of the candidate quantization step sizes. One or more quantization step sizes are determined from the set of candidate quantization step sizes for the current block. Transform coefficients of the current block are determined based on the determined one or more quantization step sizes. The current block is reconstructed based on the determined transform coefficients of the current block.

In an example, based on a first quantization parameter of the quantization parameters being equal to a multiple of a second quantization parameter of the quantization parameters of the current picture, a first quantization step size of the set of candidate quantization step sizes associated with the first quantization parameter is determined as equal to a second quantization step size of the set of candidate quantization step sizes associated with the second quantization parameter.

In an example, a number of the candidate quantization step sizes of the set of candidate quantization step sizes for the current block is a multiple of 64.

In an aspect, to determine the transform coefficients, a first transform coefficient of the transform coefficients of the current block is determined based on a product of a first quantized transform coefficient and a first value obtained from a two-dimensional array. Row indices in a row dimension of the two-dimensional array include zero and one, and a number of column indices in a column dimension of the two-dimensional array is equal to a multiple of six.

In an example, the first value is obtained based on an entry value of the two-dimensional array that is indicated by a row index of the row indices and a column index of the column indices. The row index is determined based on a flag. The column index is determined based on a modulo operation that is performed based on (i) a sum of a quantization parameter of the current block and one and (ii) the multiple of six, a value of the quantization parameter of the current block being within 0 and a multiple of 64 minus 1.

In an example, to determine the set of candidate quantization step sizes, a set of initial quantization step sizes is determined. One or more quantization step sizes are interpolated between at least two adjacent initial quantization step sizes of the set of initial quantization step sizes based on one of a linear interpolation and a non-linear model.

In an example, the set of candidate quantization step sizes includes a first subset of candidate quantization step sizes for a luma component of the current block and a second subset of candidate quantization step sizes for a chroma component of the current block. A number of the first subset of candidate quantization step sizes is different from a number of the second subset of candidate quantization step sizes.

In an example, a first set of quantization parameters is determined for a first one of the current picture, a tile of the current picture, a CTU of the current picture, and the current block of the current picture. A second set of quantization parameters is determined for a second one of the current picture, a tile of the current picture, a CTU of the current picture, and the current block of the current picture. A number of the first set of quantization parameters is different from a number of the second set of quantization parameters.

In an example, candidate values of quantization parameters associated with a luma component of the current block are in a first range. Candidate values of quantization parameter offsets between the luma component and a chroma component of the current block are in a second range that is different from the first range.

In an example, to determine the set of candidate quantization step sizes, a first set of candidate quantization step sizes and a second set of candidate quantization step sizes are determined for the current block. A first clipping range of candidate values of quantization parameter offsets associated with the first set of candidate quantization step sizes is different from a second clipping range of candidate values of quantization parameter offsets associated with the second set of candidate quantization step sizes.

In an example, to determine the set of candidate quantization step sizes, a first set of candidate quantization step sizes and a second set of candidate quantization step sizes for the current block are determined. A first range of candidate offset values associated with the first set of candidate quantization step sizes that is used in a deblock filter is different from a second range of candidate offset values associated with the second set of candidate quantization step sizes that is used in the deblock filter.

In an example, to determine the set of candidate quantization step sizes, a first set of candidate quantization step sizes associated with a first coding mode and a second set of candidate quantization step sizes associated with a second coding mode are determined for the current block. A first range of quantization parameter offset values associated with the first set of candidate quantization step sizes is different from a second range of quantization parameter offset values associated with the second set of candidate quantization step sizes.

In an example, the number of the first subset of candidate quantization step sizes is equal to a first value, and the number of the second subset of candidate quantization step sizes is equal to a second value. A first QP bitdepth offset value associated with the luma component is QpBDOffsetY, and a second QP bitdepth offset value associated with the chroma component is QpBDOffsetC. An input range of a piecewise linear model for a luma-to-chroma QP mapping table is [−QpBdOffsetY, first value−1], and an output range of the piecewise linear model for the luma-to-chroma QP mapping table is [−QpBdOffsetC, second value−1].

According to another aspect of the disclosure, an apparatus is provided. The apparatus includes processing circuitry. The processing circuitry can be configured to perform any of the described methods for video decoding/encoding. In an example, the processing circuitry is configured to receive a video bitstream including a current block in a current picture. The processing circuitry is configured to determine a set of candidate quantization step sizes of a current block from a plurality of sets of candidate quantization step sizes associated with quantization parameters (QPs), where each of the plurality of sets of candidate quantization step sizes includes a different number of the candidate quantization step sizes. The processing circuitry is configured to determine one or more quantization step sizes from the set of candidate quantization step sizes for the current block. The processing circuitry is configured to determine transform coefficients of the current block based on the determined one or more quantization step sizes. The processing circuitry is configured to reconstruct the current block based on the determined transform coefficients of the current block.

Aspects of the disclosure also provide a non-transitory computer-readable medium storing instructions which, when executed by a computer, cause the computer to perform any of the methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
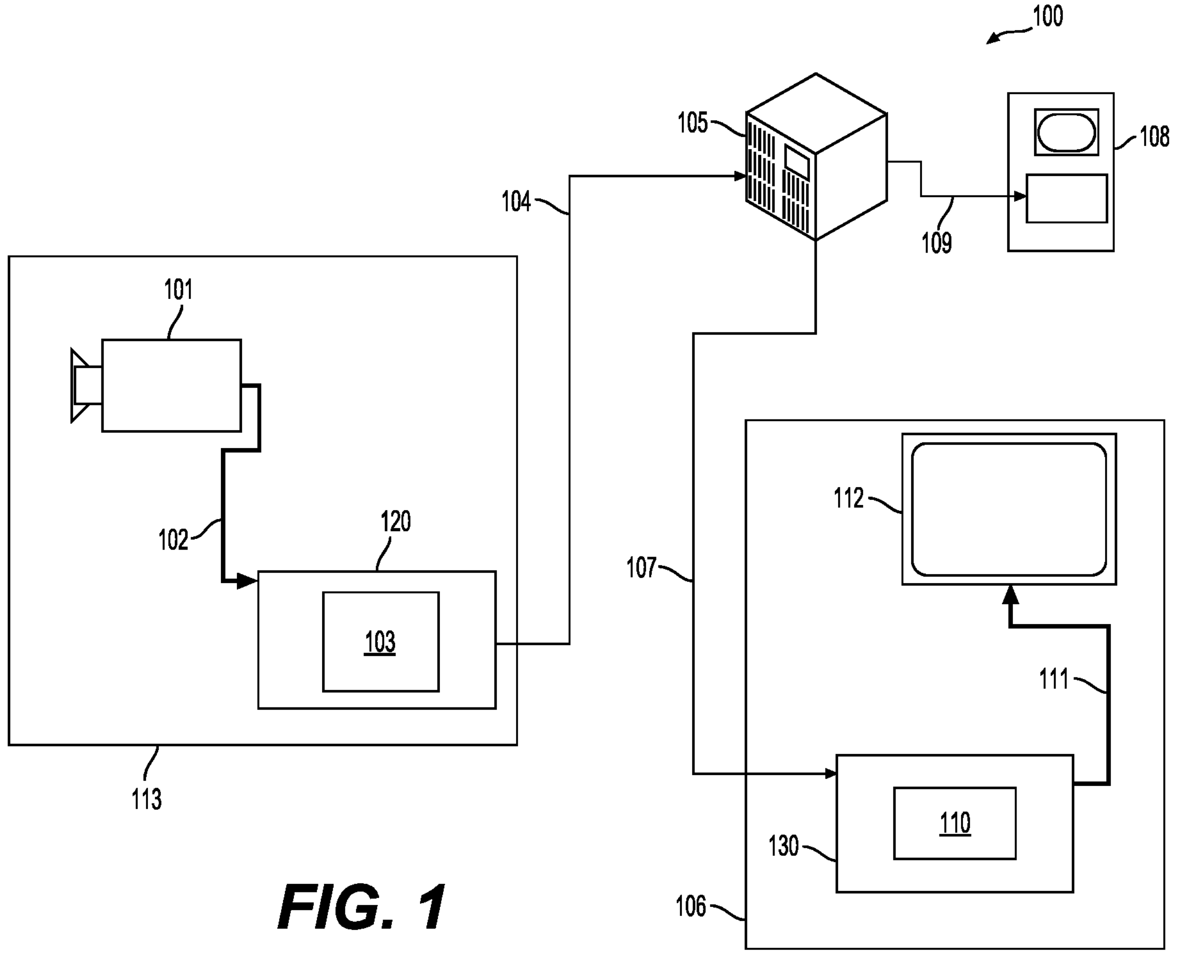
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
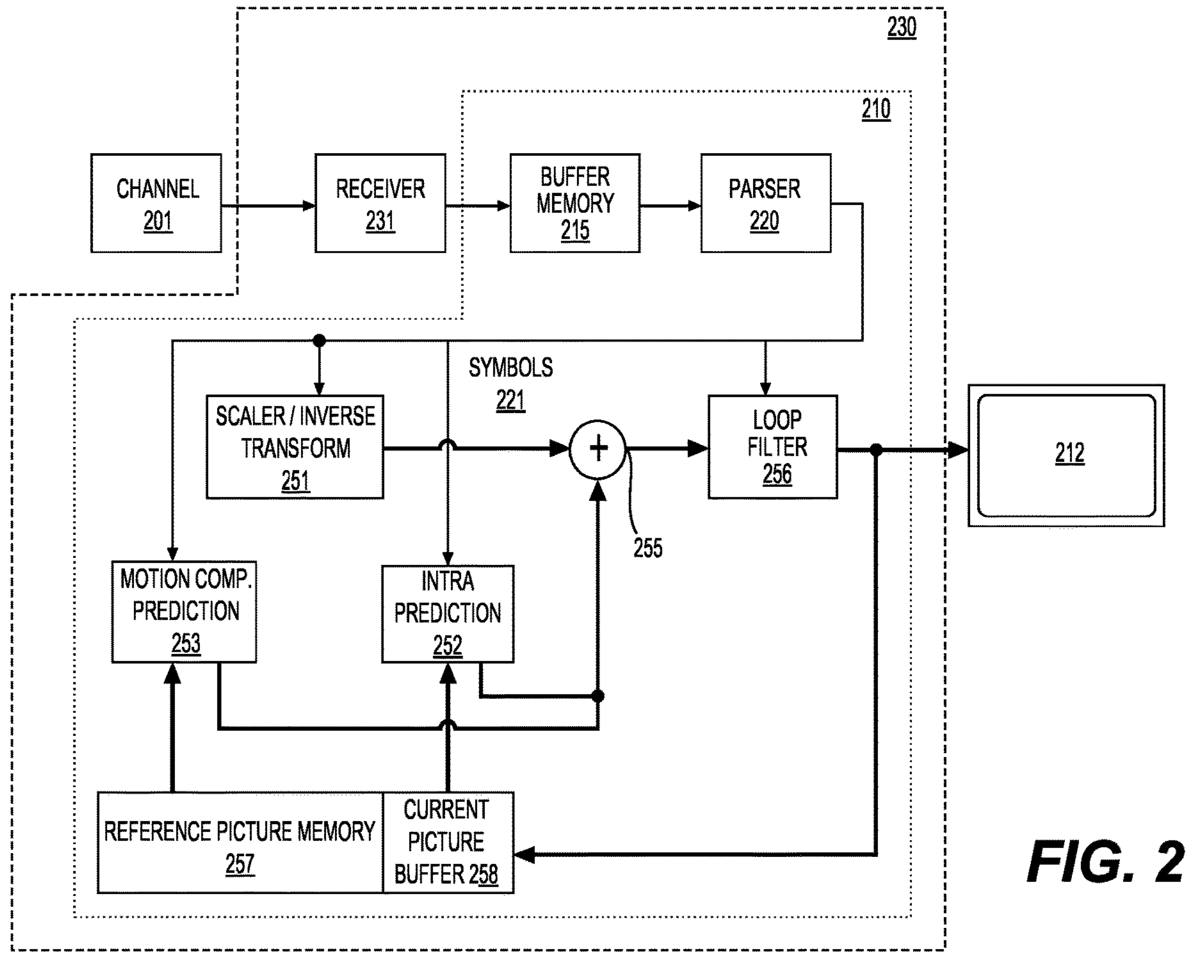
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
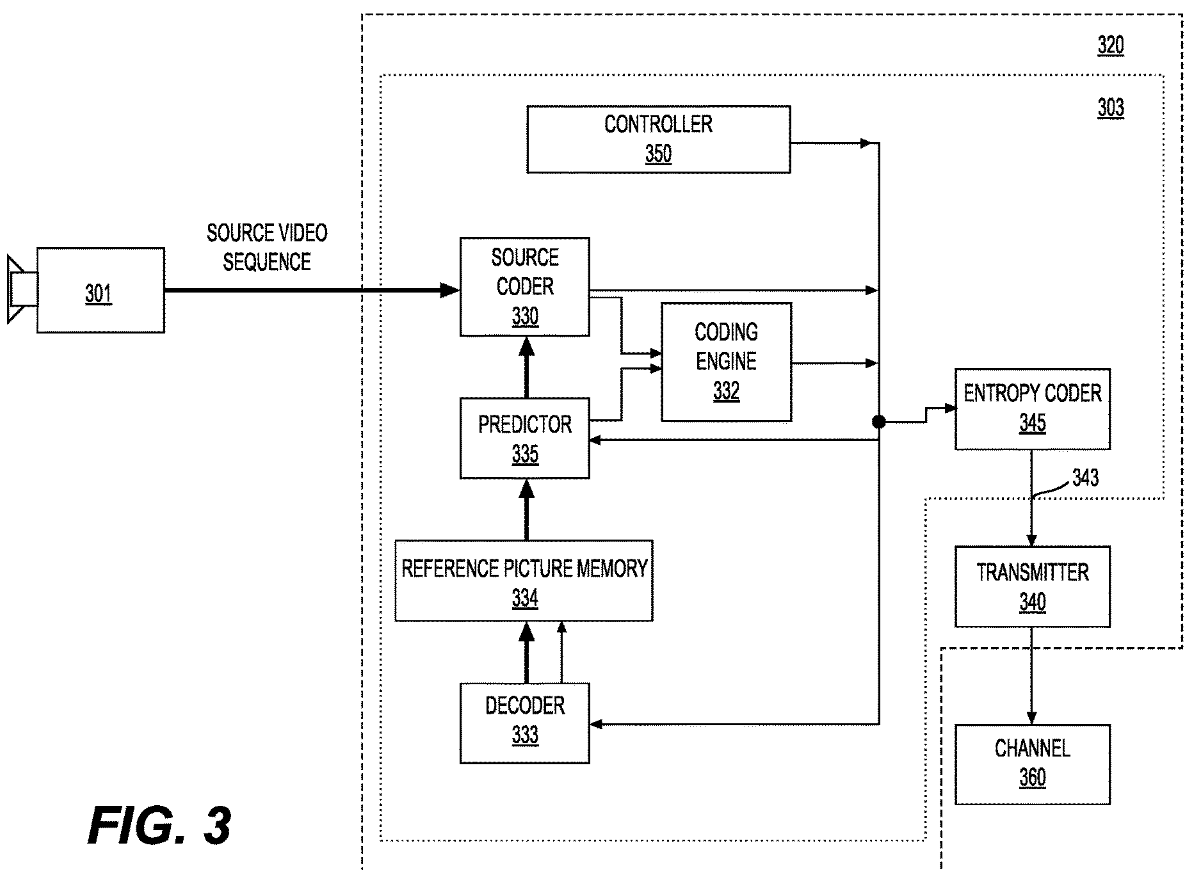
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

This disclosure includes aspects related to an extended quantizer with finer step sizes. For example, a quantization step size range can be extended from 64 to K different quantization step sizes.

In an aspect, a maximum quantization parameter (QP) can be extended from 51 to 63 and signaling of an initial QP can be changed accordingly. An initial value of SliceQpY can be modified at a slice segment layer when a non-zero value of slice_qp_delta is coded. For example, a value of init_qp_minus26 can be modified to be in a range of (−26+QpBdOffsetY) to +37. When a size of a transform block is not a power of 4, transform coefficients can be processed along with a modification to a QP or a QP levelScale table rather than be multiplied by 181/256 (or 181/128), to compensate for an implicit scaling by the transform process. For a transform skip block, a minimum allowed QP can be defined as 4 because a quantization step size becomes 1 when QP is equal to 4.

In an aspect, a fixed look-up table can be used to convert a luma quantization parameter $QP_Y$ to a chroma quantization parameter $QP_C$. In an aspect, a more flexible luma-to-chroma QP mapping can be used. Instead of having a fixed table, the luma-to-chroma QP mapping relationship can be signalled in a SPS using a flexible piecewise linear model. A constraint on the linear model can be applied such that a slope of each piece may not be negative. For example, as a luma QP increases, a chroma QP can stay flat or increase, but may not decrease. The piecewise linear model can be defined by: (1) a number of pieces in the model, and (2) input (luma) and output (chroma) delta QPs for each piece. An input range of the piecewise linear model can be $[-QpBdOffset_Y, 63]$ and an output range of the piecewise linear model can be $[-QpBdOffset_C, 63]$. The QP mapping relationship can be signalled separately for Cb, Cr, and joint Cb/Cr coding, or signalled jointly for all three types of residual coding.

In an aspect, CU-level QP adaptation can be allowed. Delta QP values for luma and chroma components can be signalled separately. For the chroma components, the allowed chroma QP offset values can be signalled in a form of offset lists in a PPS. The lists can be defined separately for Cb, Cr and joint Cb/Cr coding. Up to 6 offset values can be allowed for each of Cb, Cr, and joint Cb/Cr lists. At a CU-level, an index can be signalled to indicate which one of the offset values in the offset list is used to adjust the chroma QP for that CU. CU chroma QP offset signalling can also be consistent with the virtual pipeline decoding unit (VPDU) CU QP delta availability. For a CU larger than 64×64, the chroma QP offset can be sent with a first transform unit regardless of whether the first transform unit has non-zero coded block flag (CBF) or not.

In as aspect, such as in VVC, a dequantization process on transform coefficients can be formulated as follows in equation (1):

$$dqx[x][y] = (qx[x][y]^{*} levelScale[rectNonTsFlag][(qP+1)\%\ 6]) \ll ((qP+1)/6) \quad \text{Eq. (1)}$$

where qP is a QP value, qx[x][y] and dqx[x][y] are an input quantized transofrm coefficient and an output quantized transform coefficient respectively, and rectNonTsFlag is a flag derived as follows in equation (2) when a transform skip mode is not applied:

$$rectNonTsFlag = (((\text{Log2}(nTbW) + \text{Log2}(nTbH))\ \&1) == 1)\ ?\ 1 : 0 \quad \text{Eq. (2)}$$

When the transform skip mode is applied, rectNonTsFlag can be set as 0. levelScale[ ][ ] can be a hard coded look-up table as shown below in equation (3):

$$levelScale[j][k] = \{\{40, 45, 51, 57, 64, 72\}, \{57, 64, 72, 80, 90, 102\}\}. \quad \text{Eq. (3)}$$

A quantization parameter related syntax in a slice header can be shown below in table 1.

TABLE 1

An exemplary quantization parameter related syntax in a slice header

| | Descriptor |
|---|---|
| slice_header( ) { | |
| ... | |
| if( !qp_delta_info_in_ph_flag ) | |
| slice_qp_delta | se(v) |
| if( pps_slice_chroma_qp_offsets_present_flag ) { | |
| slice_cb_qp_offset | se(v) |
| slice_cr_qp_offset | se(v) |

TABLE 1-continued

| An exemplary quantization parameter related syntax in a slice header | Descriptor |
|---|---|
| if( sps_joint_cbcr_enabled_flag ) | |
| slice_joint_cbcr_qp_offset | se(v) |
| } | |
| if( pps_cu_chroma_qp_offset_list_enabled_flag ) | |
| cu_chroma_qp_offset_enabled_flag | u(1) |

In an aspect, a maximum QP can be set as 63. However, a small QP change, such +1 or −1 at a frame level, can have a big impact on coding results. In such an example, there may not be sufficient granularity of quantizer tuning for practical applications.

According to an aspect of the disclosure, a set of candidate quantization step sizes of a current block is determined from a plurality of sets of candidate quantization step sizes associated with quantization parameters (QPs). Each of the plurality of sets of candidate quantization step sizes includes a different number of the candidate quantization step sizes.

In an aspect, a quantization step size range can be extended from 64 to K different quantization step sizes. In an example, the extended quantization step size range can be generalized to other values for different codecs. Example values of K include, but are not limited to 128, 256, 512, 1024, 2048.

In an example, a current block can have a set of candidate quantization step sizes. A number of the set of candidate quantization step sizes for a current block can be K that is larger than a threshold value, such as 64. In an example, K can include, but is not limited to 128, 256, 512, 1024, 2048. In an example, the number of the set of candidate quantization step sizes K for the current block can be a multiple of 64. Accordingly, a multiple of 64 (such as 128, 256, 512, 1024, 2048) candidate quantization step sizes can be applied to the current block.

In an aspect, a quantization step size associated with a QP value q0 in VVC can be a same quantization step size associated with a QP value that is a multiple of q0, such as q0×M, where example values of M can include, but are not limited to 2, 4, 8, 16, K/64.

In an example, when a first quantization parameter is a multiple of a second quantization parameter, a first quantization step size of the set of candidate quantization step sizes associated with the first quantization parameter can be equal to a second quantization step size of the set of candidate quantization step sizes associated with the second quantization parameter. In an example, the first quantization parameter is equal to a product of M and the second quantization parameter, where the M can include, but is not limited to 2, 4, 8, 16, K/64.

In an aspect, the value of K can be an integer multiple of 64. For example, K is equal to 64×N, where N is an integer.

In an aspect, the value of K is an integer multiple of 64. For example, K is equal to 64×N, where N is a power of 2.

According to an aspect of the disclosure, transform coefficients of the current block are determined based on one or more quantization step sizes.

In an aspect, a dequantization process is defined as follows in equation (4).

$$dqx[x][y] = qx[x][y]^{*} levelScale[rectNonTsFlag][(qP+1)(6^{*}N)]) \ll ((qP+1)/(6^{*}N)) \quad \text{Eq. (4)}$$

where qP can indicate a QP value. qx[x][y] and dqx[x][y] can be an input quantized transform coefficient and an output quantized transform coefficient, respectively. rectNonTsFlag is a flag derived according to equation (2), for exaple. N in equation (4) can indicate a finer quantization step size.

In an aspect, a qP value range and a definition of levelScale array are also different from the qP value range and the definition of levelScale array above.

In an aspect, for the two-dimensional array levelScale[j][k], k can range from 0 to 6×N−1. An example of levelScale when N equals to 4 can be shown as follows in equation (5).

$$levelScale[j][k] = \{\{40, 41, 43, 44, 45, 47, 48, 50, 51, 53, 54, 56, 57, 59, 61, 62, 64, 66, 68, 70, 72, 74, 76, 78\}, \{57, 59, 61, 62, 64, 66, 68, 70, 72, 74, 76, 78, 80, 82, 86, 88, 91, 94, 96, 100, 102, 106, 108, 112\}\} \quad \text{Eq. (5)}$$

In an example, as shown in equation (5), j stands for a two-dimensional direction. j can be 0 or 1. If j is 0, then K corresponds to {40 . . . 78}. If j is 1, then K corresponds to {57 . . . 112}. Accordingly, if [j][k]=[0][0], levelScale[0][0]=40, if [j][k]=[0][23], then levelScale[0][23]=78.

In an aspect, a value of qP can range from 0 to 64×N−1.

In an example, the value of qP can be a value between 0 and 64×N−1. N can be an integer or N can be a power of 2. In an example, the value of qP can be a value between −6×N×(Bitdepth−8) and 64×N−1.

In an aspect, the quantization step sizes can be extended from VVC quantization step sizes as follows: the original quantization step sizes defined in VVC are kept, and the extended quantization step sizes are derived by interpolating two adjacent quantization step sizes in the original quantization step size with a pre-defined formula.

In an aspect, the pre-defined formula represents a linear interpolation.

In an aspect, the pre-defined formula represents a non-linear model such that the QP to quantization step sizes mapping is not linear between two adjacent QP (or quantization step sizes) of VVC.

In an example, a set of initial quantization step sizes can be determined. One or more quantization step sizes can be interpolated between at least two adjacent initial quantization step sizes of the set of initial quantization step sizes based on one of a linear interpolation and a non-linear model.

In an aspect, interpolation can be applied to add entries in the levelScale array which is defined in VVC spec to perform dequantization, where the levelScale array can be derived by extending the entry values between adjacent entry values in the original levelScale array defined by VVC.

In an example, the original levelScale array can be defined as levelScale[j][k]={{40, 45, 51, 57, 64, 72}, {57, 64, 72, 80, 90, 102} by VVC. Additional entries can be added between two adjacent entry values in levelScale array, such as 40 and 45, by interpolation. The interpolation can be a linear interpolation or a non-linear interpolation.

In an aspect, the value of K and/or N can be signaled in high-level syntax, including, but not limited to a sequence header, a picture header, a slice header, a tile header.

In an aspect, the value of K and/or N can be different for different color components. For example, the number of quantization step sizes applied on a luma color component can be larger than the number of quantization step sizes applied on a chroma color component.

In an aspect, a granularity of signaling of a quantization parameter or a delta quantization parameter at different frame/tile/CTU/CU levels can be different.

In an example, a first set of quantization parameters for a first one of a current picture, a tile of the current picture, a CTU of the current picture, and the current block of the current picture can be determined. A second set of quantization parameters for a second one of the current picture, a tile of the current picture, a CTU of the current picture, and the current block of the current picture can be determined. A number of the first set of quantization parameters is different from a number of the second set of quantization parameters.

In an aspect, at a frame level, the quantization parameter can be signaled at a coarser granularity compared to a maximum range of quantization step sizes. For example, a set of 64 quantization step sizes can be selected from the full 256 quantization step sizes to apply on the frame level. However, at a block level, the quantization parameter or delta quantization parameter can be signaled at the finer granularity. For example, the 256 quantization step sizes can be applied on the block level.

In an aspect, the granularity of signaling of a quantization parameter difference/offset (e.g., delta QP, which can be syntaxes slice_cb_qp_offset and slice_cr_qp_offset signaled in a slice header in VVC) between different color components can be different from the signaling of quantization parameter of the same color component.

In an example, candidate values of quantization parameters associated with a luma component of the current block are in a first range, and candidate values of quantization parameter offsets between the luma component and a chroma component of the current block are in a second range that is different from the first range.

In an aspect, the quantization parameter for a luma component can be signaled with 256 different QP values, but the difference/offset between a luma component and a chroma component (e.g., delta QP between the luma component and the chroma component) can be signaled with only 64 QP values.

In an aspect, the quantization parameter for a luma component can be signaled with 64 different QP values, but the difference/offset between a luma component and a chroma component (e.g., a delta QP between the luma component and the chroma component) is signaled with 256 QP values.

In an aspect, for different granularity (or different selections) of quantization step sizes, a clipping range of a quantization parameter offset can also be different.

In an example, a first set of candidate quantization step sizes and a second set of candidate quantization step sizes can be determined for the current block. A first clipping range of candidate values of quantization parameter offsets associated with the first set of candidate quantization step sizes is different from a second clipping range of candidate values of quantization parameter offsets associated with the second set of candidate quantization step sizes.

In an aspect, for different granularity of quantization step sizes, a valid range of quantization related offset values used in a deblock filter (e.g., a beta offset and/or a tc offset), can be different.

In an example, a first set of candidate quantization step sizes and a second set of candidate quantization step sizes can be determined for the current block. A first range of candidate offset values associated with the first set of candidate quantization step sizes that is used in a deblock filter is different from a second range of candidate offset values associated with the second set of candidate quantization step sizes that is used in the deblock filter.

In an aspect, for different granularity of quantization step sizes, a quantization related offset or a threshold value in different coding tools, e.g., JCCR, can be different.

In an example, a first set of candidate quantization step sizes associated with a first coding mode and a second set of candidate quantization step sizes associated with a second coding mode for the current block are determined. A first range of quantization parameter offset values associated with the first set of candidate quantization step sizes is different from a second range of quantization parameter offset values associated with the second set of candidate quantization step sizes.

In an aspect, the value(s) of K and/or N also determine(s) the size of luma-to-chroma QP mapping tables.

In an aspect, if a quantization step size range is equal to 256 for all color components, an input range of a piecewise linear model for a luma-to-chroma QP mapping table can be [−QpBdOffsetY, 255] and an output range of the piecewise linear model for the luma-to-chroma QP mapping table can be [−QpBdOffsetC, 255].

In an aspect, if a quantization step size range for a luma component is equal to 256 and a quantization step size range for a chroma component is equal to 64, an input range of a piecewise linear model for a luma-to-chroma QP mapping table can be [−QpBdOffsetY, 255] and an output range of the piecewise linear model for the luma-to-chroma QP mapping table can be [−QpBdOffsetC, 63].

In an aspect, if a quantization step size range for a luma component is equal to 64 and a quantization step size range for a chroma component is equal to 256, an input range of a piecewise linear model for a luma-to-chroma QP mapping table can be [−QpBdOffsetY, 63] and an output range of the piecewise linear model for the luma-to-chroma QP mapping table can be [−QpBdOffsetC, 255].

In an example, a number of the first set of candidate quantization step sizes associated with a luma component is equal to a first value (e.g., 64 or 256), and a number of a second set of candidate quantization step sizes associated with a chroma component is equal to a second value (e.g., 64 or 256). A first QP bitdepth offset value associated with the luma component is QpBDOffsetY, and a second QP bitdepth offset value associated with the chroma component is QpBDOffsetC. An input range of a piecewise linear model for a luma-to-chroma QP mapping table is [−QpBdOffsetY, first value−1], and an output range of the piecewise linear model for the luma-to-chroma QP mapping table is [−QpBdOffsetC, second value−1].

In an example, the value for −QpBdOffsetY can be equal to −6*N*(Bitdepth−8), and −QpBdOffsetC can be different from −QpBdOffsetY.

Figure 4:
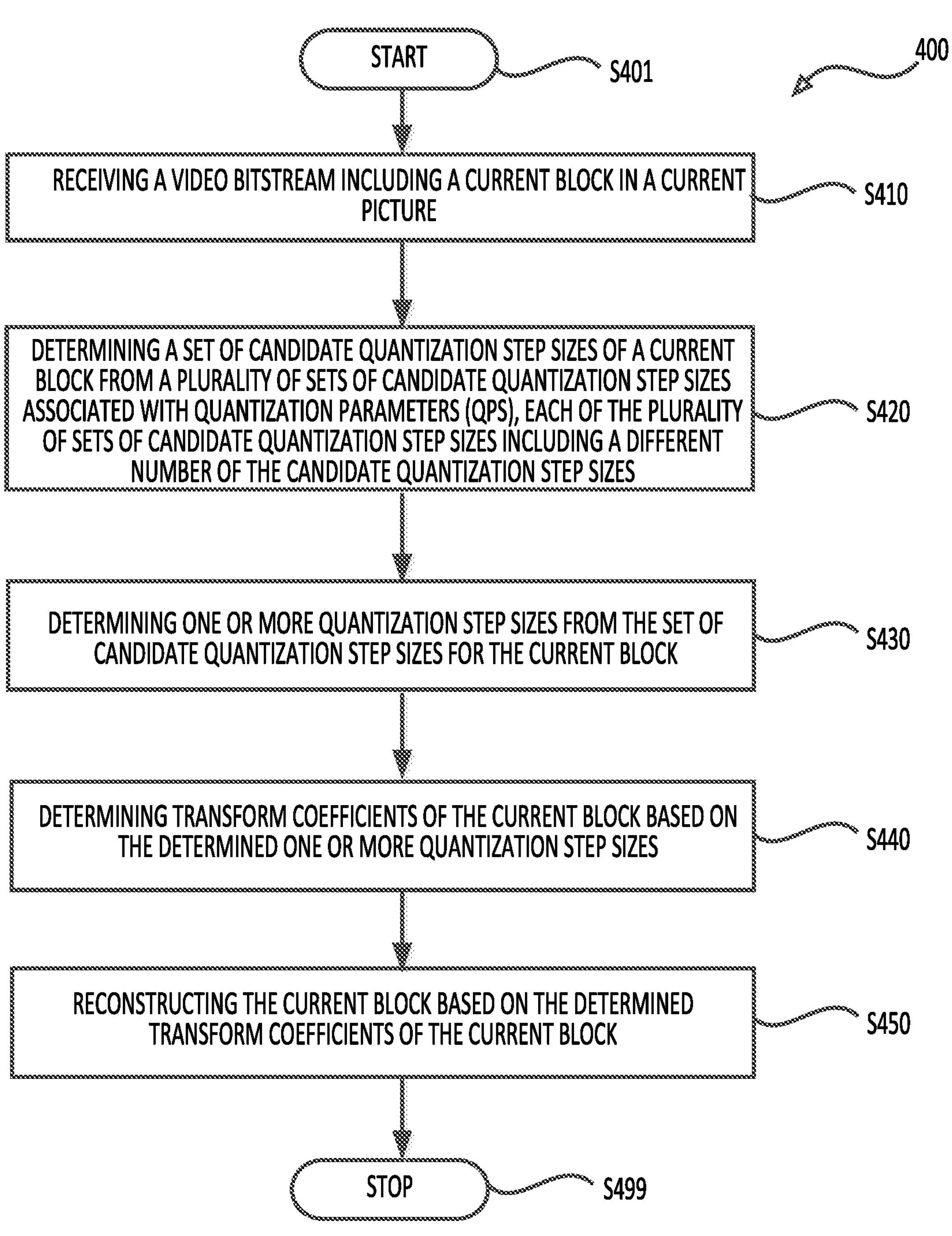
FIG. 4 shows a flow chart outlining a decoding process according to some embodiments of the disclosure.

FIG. 4 shows a flow chart outlining a process (400) according to an embodiment of the disclosure. The process (400) can be used in a video decoder. In various embodiments, the process (400) is executed by processing circuitry, such as the processing circuitry that performs functions of the video decoder (110), the processing circuitry that performs functions of the video decoder (210), and the like. In some embodiments, the process (400) is implemented in software instructions, thus when the processing circuitry executes the software instructions, the processing circuitry performs the process (400). The process starts at (S401) and proceeds to (S410).

At (S410), a video bitstream including a current block in a current picture is received.

At (S420), a set of candidate quantization step sizes of a current block is determined from a plurality of sets of candidate quantization step sizes associated with quantization parameters (QPs). Each of the plurality of sets of candidate quantization step sizes includes a different number of the candidate quantization step sizes.

At (S430), one or more quantization step sizes are determined from the set of candidate quantization step sizes for the current block.

At (S440), transform coefficients of the current block are determined based on the determined one or more quantization step sizes.

At (S450), the current block is reconstructed based on the determined transform coefficients of the current block.

In an example, based on a first quantization parameter of the quantization parameters being equal to a multiple of a second quantization parameter of the quantization parameters of the current picture, a first quantization step size of the set of candidate quantization step sizes associated with the first quantization parameter is determined as equal to a second quantization step size of the set of candidate quantization step sizes associated with the second quantization parameter.

In an example, a number of the candidate quantization step sizes of the set of candidate quantization step sizes for the current block is a multiple of 64.

In an aspect, to determine the transform coefficients, a first transform coefficient of the transform coefficients of the current block is determined based on a product of a first quantized transform coefficient and a first value obtained from a two-dimensional array. Row indices in a row dimension of the two-dimensional array include zero and one, and a number of column indices in a column dimension of the two-dimensional array is equal to a multiple of six.

In an example, the first value is obtained based on an entry value of the two-dimensional array that is indicated by a row index of the row indices and a column index of the column indices. The row index is determined based on a flag. The column index is determined based on a modulo operation that is performed based on (i) a sum of a quantization parameter of the current block and one and (ii) the multiple of six, a value of the quantization parameter of the current block being within 0 and a multiple of 64 minus 1.

In an example, to determine the set of candidate quantization step sizes, a set of initial quantization step sizes is determined. One or more quantization step sizes are interpolated between at least two adjacent initial quantization step sizes of the set of initial quantization step sizes based on one of a linear interpolation and a non-linear model.

In an example, the set of candidate quantization step sizes includes a first subset of candidate quantization step sizes for a luma component of the current block and a second subset of candidate quantization step sizes for a chroma component of the current block. A number of the first subset of candidate quantization step sizes is different from a number of the second subset of candidate quantization step sizes.

In an example, a first set of quantization parameters is determined for a first one of the current picture, a tile of the current picture, a CTU of the current picture, and the current block of the current picture. A second set of quantization parameters is determined for a second one of the current picture, a tile of the current picture, a CTU of the current picture, and the current block of the current picture. A number of the first set of quantization parameters is different from a number of the second set of quantization parameters.

In an example, candidate values of quantization parameters associated with a luma component of the current block are in a first range. Candidate values of quantization parameter offsets between the luma component and a chroma component of the current block are in a second range that is different from the first range.

In an example, to determine the set of candidate quantization step sizes, a first set of candidate quantization step sizes and a second set of candidate quantization step sizes are determined for the current block. A first clipping range of candidate values of quantization parameter offsets associated with the first set of candidate quantization step sizes is different from a second clipping range of candidate values of quantization parameter offsets associated with the second set of candidate quantization step sizes.

In an example, to determine the set of candidate quantization step sizes, a first set of candidate quantization step sizes and a second set of candidate quantization step sizes for the current block are determined. A first range of candidate offset values associated with the first set of candidate quantization step sizes that is used in a deblock filter is different from a second range of candidate offset values associated with the second set of candidate quantization step sizes that is used in the deblock filter.

In an example, to determine the set of candidate quantization step sizes, a first set of candidate quantization step sizes associated with a first coding mode and a second set of candidate quantization step sizes associated with a second coding mode are determined for the current block. A first range of quantization parameter offset values associated with the first set of candidate quantization step sizes is different from a second range of quantization parameter offset values associated with the second set of candidate quantization step sizes.

In an example, the number of the first subset of candidate quantization step sizes is equal to a first value, and the number of the second subset of candidate quantization step sizes is equal to a second value. A first QP bitdepth offset value associated with the luma component is QpBDOffsetY, and a second QP bitdepth offset value associated with the chroma component is QpBDOffsetC. An input range of a piecewise linear model for a luma-to-chroma QP mapping table is [−QpBdOffsetY, first value−1], and an output range of the piecewise linear model for the luma-to-chroma QP mapping table is [−QpBdOffsetC, second value−1].

Then, the process proceeds to (S499) and terminates.

The process (400) can be suitably adapted. Step(s) in the process (400) can be modified and/or omitted. Additional step(s) can be added. Any suitable order of implementation can be used.

Figure 5:
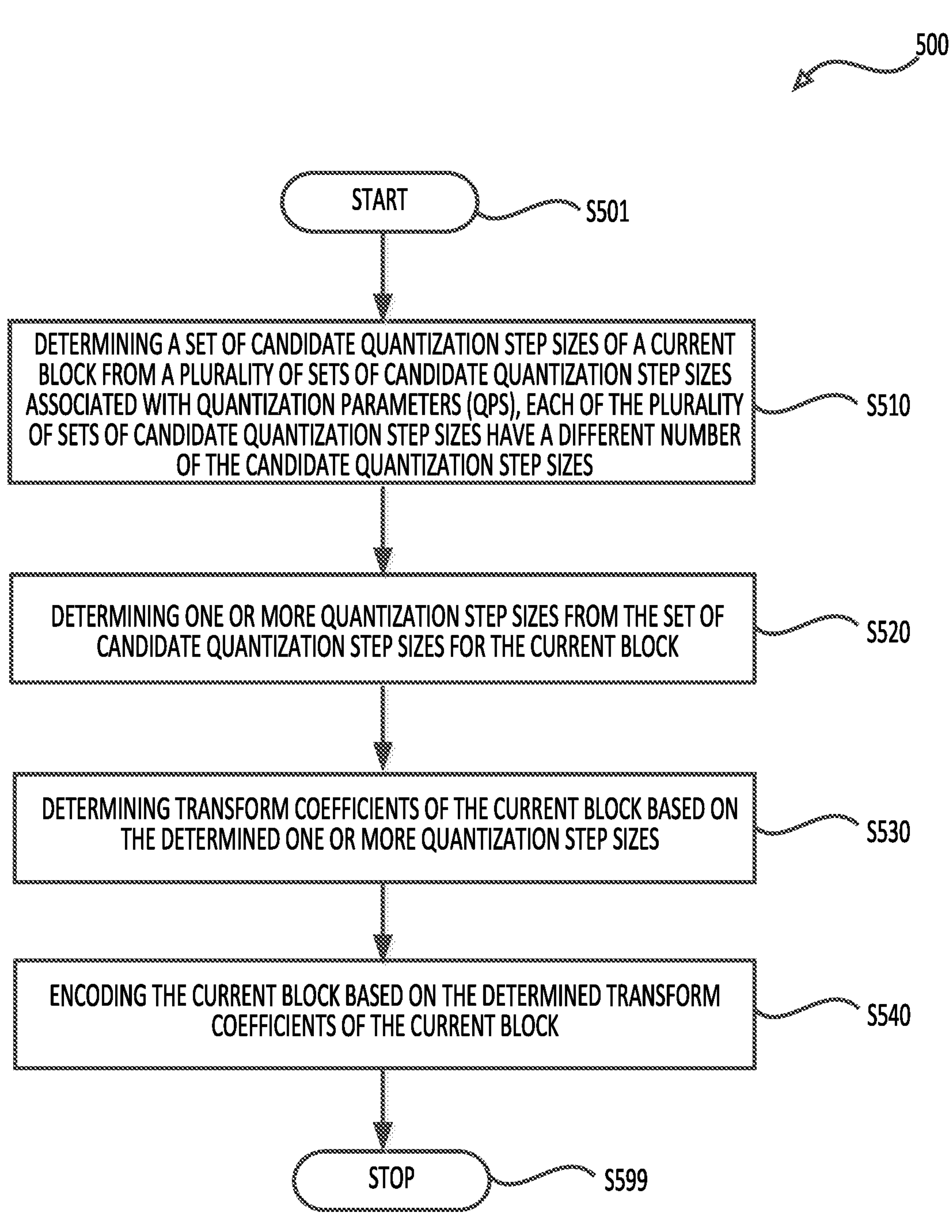
FIG. 5 shows a flow chart outlining an encoding process according to some embodiments of the disclosure.

FIG. 5 shows a flow chart outlining a process (500) according to an embodiment of the disclosure. The process (500) can be used in a video encoder. In various embodiments, the process (500) is executed by processing circuitry, such as the processing circuitry that performs functions of the video encoder (103), the processing circuitry that performs functions of the video encoder (303), and the like. In some embodiments, the process (500) is implemented in software instructions, thus when the processing circuitry executes the software instructions, the processing circuitry performs the process (500). The process starts at (S501) and proceeds to (S510).

At (S510), a set of candidate quantization step sizes of a current block is determined from a plurality of sets of candidate quantization step sizes associated with quantization parameters (QPs), where each of the plurality of sets of candidate quantization step sizes have a different number of the candidate quantization step sizes.

At (S520), one or more quantization step sizes are determined from the set of candidate quantization step sizes for the current block.

At (S530), transform coefficients of the current block are determined based on the determined one or more quantization step sizes.

At (S540), the current block is encoded based on the determined transform coefficients of the current block.

Then, the process proceeds to (S599) and terminates.

The process (500) can be suitably adapted. Step(s) in the process (500) can be modified and/or omitted. Additional step(s) can be added. Any suitable order of implementation can be used.

The techniques described above, can be implemented as computer software using computer-readable instructions and physically stored in one or more computer-readable media. For example, FIG. 6 shows a computer system (600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
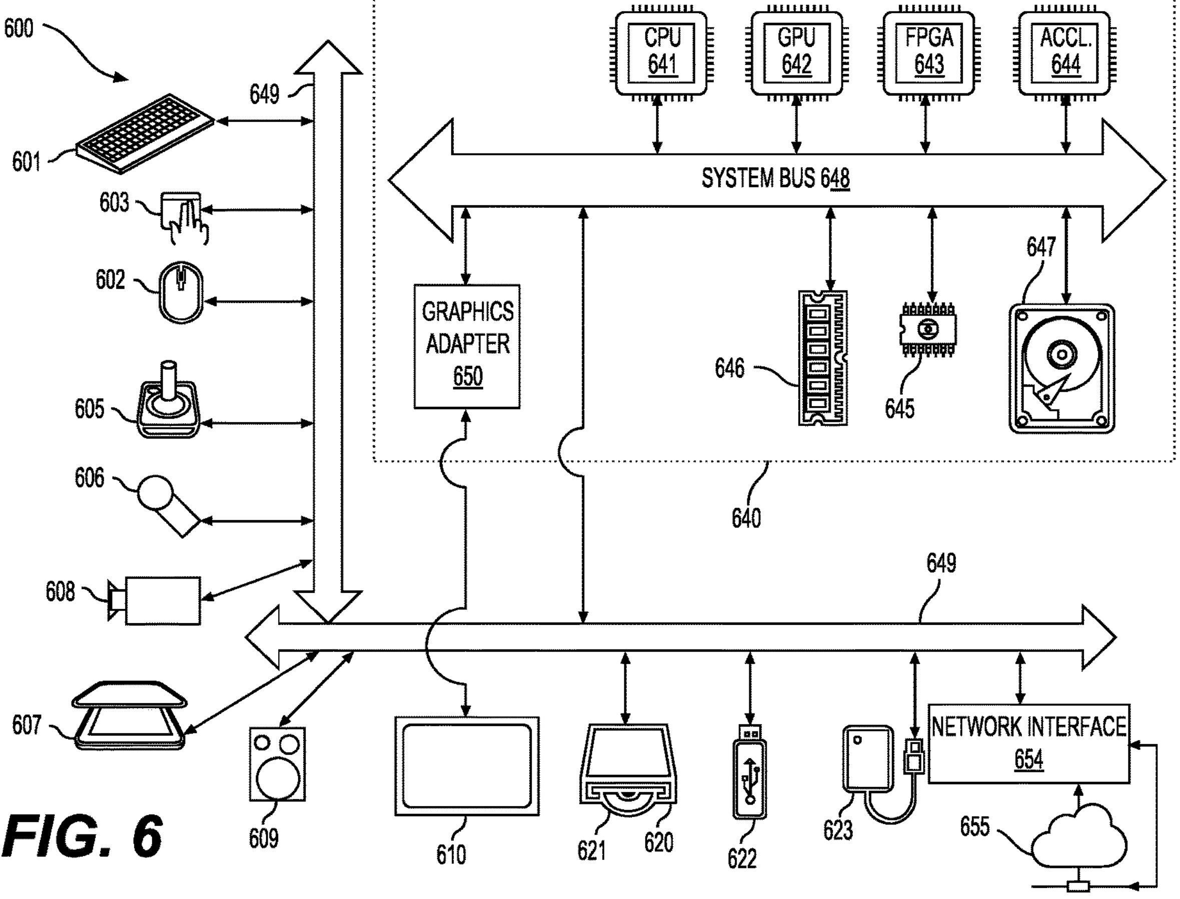
FIG. 6 is a schematic illustration of a computer system in accordance with an embodiment.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include an interface (654) to one or more communication networks (655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), graphics adapters (650), and so forth. These devices, along with Read-only memory (ROM) (645), Random-access memory (646), internal mass storage such as internal non-user accessible hard drives, SSDs, and the like (647), may be connected through a system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). In an example, the screen (610) can be connected to the graphics adapter (650). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600), and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, the method comprising:

receiving a video bitstream including a current block in a current picture;

determining a set of candidate quantization step sizes of the current block from a plurality of sets of candidate quantization step sizes associated with quantization parameters (QPs), each of the plurality of sets of candidate quantization step sizes including a different number of the candidate quantization step sizes that is N times 64, N being an integer greater than 1;

determining one or more quantization step sizes from the set of candidate quantization step sizes for the current block;

determining transform coefficients of the current block based on the determined one or more quantization step sizes; and reconstructing the current block based on the determined transform coefficients of the current block.

2. The method of claim 1, further comprising:

based on a first quantization parameter of the quantization parameters being equal to a multiple of a second quantization parameter of the quantization parameters of the current picture, determining that a first quantization step size of the set of candidate quantization step sizes associated with the first quantization parameter is equal to a second quantization step size of the set of candidate quantization step sizes associated with the second quantization parameter.

3. The method of claim 1, wherein a number of the candidate quantization step sizes of the set of candidate quantization step sizes for the current block is N times 64, N being an integer greater than 1.

4. The method of claim 1, wherein:

the determining the transform coefficients includes determining a first transform coefficient of the transform coefficients of the current block based on a product of a first quantized transform coefficient and a first value obtained from a two-dimensional array, row indices in a row dimension of the two-dimensional array include zero and one, and a number of column indices in a column dimension of the two-dimensional array is equal to a multiple of six.

5. The method of claim 4, wherein the first value is obtained based on an entry value of the two-dimensional array that is indicated by a row index of the row indices and a column index of the column indices, the row index being determined based on a flag, the column index being determined based on a modulo operation that is performed based on (i) a sum of a quantization parameter of the current block and one and (ii) the multiple of six, a value of the quantization parameter of the current block being within 0 and a multiple of 64 minus 1.

6. The method of claim 1, wherein the determining the set of candidate quantization step sizes further comprises:
determining a set of initial quantization step sizes; and
interpolating one or more quantization step sizes between at least two adjacent initial quantization step sizes of the set of initial quantization step sizes based on one of a linear interpolation and a non-linear model.

7. The method of claim 1, wherein the set of candidate quantization step sizes includes a first subset of candidate quantization step sizes for a luma component of the current block and a second subset of candidate quantization step sizes for a chroma component of the current block, a number of the first subset of candidate quantization step sizes being different from a number of the second subset of candidate quantization step sizes.

8. The method of claim 1, further comprising:
determining a first set of quantization parameters for a first one of the current picture, a tile of the current picture, a CTU of the current picture, and the current block of the current picture; and
determining a second set of quantization parameters for a second one of the current picture, a tile of the current picture, a CTU of the current picture, and the current block of the current picture, wherein:
a number of the first set of quantization parameters is different from a number of the second set of quantization parameters.

9. The method of claim 1, wherein:
candidate values of quantization parameters associated with a luma component of the current block are in a first range, and
candidate values of quantization parameter offsets between the luma component and a chroma component of the current block are in a second range that is different from the first range.

10. The method of claim 1, wherein:
the determining the set of candidate quantization step sizes further includes determining a first set of candidate quantization step sizes and a second set of candidate quantization step sizes for the current block, and
a first clipping range of candidate values of quantization parameter offsets associated with the first set of candidate quantization step sizes is different from a second clipping range of candidate values of quantization parameter offsets associated with the second set of candidate quantization step sizes.

11. The method of claim 1, wherein:
the determining the set of candidate quantization step sizes includes determining a first set of candidate quantization step sizes and a second set of candidate quantization step sizes for the current block, and
a first range of candidate offset values associated with the first set of candidate quantization step sizes that is used in a deblock filter is different from a second range of candidate offset values associated with the second set of candidate quantization step sizes that is used in the deblock filter.

12. The method of claim 1, wherein:
the determining the set of candidate quantization step sizes further includes determining a first set of candidate quantization step sizes associated with a first coding mode and a second set of candidate quantization step sizes associated with a second coding mode for the current block, and
a first range of quantization parameter offset values associated with the first set of candidate quantization step sizes is different from a second range of quantization parameter offset values associated with the second set of candidate quantization step sizes.

13. The method of claim 7, wherein:
the number of the first subset of candidate quantization step sizes is equal to a first value, the number of the second subset of candidate quantization step sizes is equal to a second value, a first QP bitdepth offset value associated with the luma component is QpBDOffsetY, and a second QP bitdepth offset value associated with the chroma component is QpBDOffsetC,
an input range of a piecewise linear model for a luma-to-chroma QP mapping table is [−QpBdOffsetY, first value−1], and
an output range of the piecewise linear model for the luma-to-chroma QP mapping table is [−QpBdOffsetC, second value−1].

14. A method of video encoding, the method comprising:
determining a set of candidate quantization step sizes of a current block in a current picture from a plurality of sets of candidate quantization step sizes associated with quantization parameters (QPs), each of the plurality of sets of candidate quantization step sizes including a different number of the candidate quantization step sizes that is N times 64, N being an integer greater than 1;
determining one or more quantization step sizes from the set of candidate quantization step sizes for the current block;
determining transform coefficients of the current block based on the determined one or more quantization step sizes; and
encoding the current block in a bitstream based on the determined transform coefficients of the current block.

15. The method of claim 14, further comprising:
based on a first quantization parameter of the quantization parameters being equal to a multiple of a second quantization parameter of the quantization parameters of the current picture,
determining that a first quantization step size of the set of candidate quantization step sizes associated with the first quantization parameter is equal to a second quantization step size of the set of candidate quantization step sizes associated with the second quantization parameter.

16. The method of claim 14, wherein the set of candidate quantization step sizes includes a first subset of candidate quantization step sizes for a luma component of the current block and a second subset of candidate quantization step sizes for a chroma component of the current block, a number of the first subset of candidate quantization step sizes being different from a number of the second subset of candidate quantization step sizes.

17. The method of claim 14, further comprising:
determining a first set of quantization parameters for a first one of the current picture, a tile of the current picture, a CTU of the current picture, and the current block of the current picture; and
determining a second set of quantization parameters for a second one of the current picture, a tile of the current picture, a CTU of the current picture, and the current block of the current picture, wherein:
a number of the first set of quantization parameters is different from a number of the second set of quantization parameters.

18. The method of claim 14, wherein:

candidate values of quantization parameters associated with a luma component of the current block are in a first range, and candidate values of quantization parameter offsets between the luma component and a chroma component of the current block are in a second range that is different from the first range.

19. The method of claim 14, wherein:

the determining the set of candidate quantization step sizes further includes determining a first set of candidate quantization step sizes and a second set of candidate quantization step sizes for the current block, and a first clipping range of candidate values of quantization parameter offsets associated with the first set of candidate quantization step sizes is different from a second clipping range of candidate values of quantization parameter offsets associated with the second set of candidate quantization step sizes.

20. A non-transitory computer-readable storage medium storing instructions which, when executed by a processor, cause the processor to perform a method of encoding a bitstream comprising:

determining a set of candidate quantization step sizes of a current block in a current picture from a plurality of sets of candidate quantization step sizes associated with quantization parameters (QPs), each of the plurality of sets of candidate quantization step sizes including a different number of the candidate quantization step sizes that is N times 64, N being an integer greater than 1;

determining one or more quantization step sizes from the set of candidate quantization step sizes for the current block;

determining transform coefficients of the current block based on the determined one or more quantization step sizes;

encoding the current block in the bitstream based on the determined transform coefficients of the current block; and transmitting the encoded bitstream.

* * * * *